United States Patent [19]

Takeuchi et al.

[11] Patent Number: 4,569,041
[45] Date of Patent: Feb. 4, 1986

[54] INTEGRATED CIRCUIT/PACKET SWITCHING SYSTEM

[75] Inventors: Takao Takeuchi; Takehiko Yamaguchi, both of Tokyo, Japan

[73] Assignee: NEC Corporation, Tokyo, Japan

[21] Appl. No.: 589,566

[22] Filed: Mar. 14, 1984

[30] Foreign Application Priority Data

Mar. 17, 1983 [JP] Japan ................................. 58-44740
May 30, 1983 [JP] Japan ................................. 58-95169
Dec. 14, 1983 [JP] Japan ................................ 58-235511

[51] Int. Cl.$^4$ ........................................... H04Q 11/04
[52] U.S. Cl. ...................................... 370/60; 370/86; 370/94
[58] Field of Search ................... 370/58, 60, 86, 89, 370/94

[56] References Cited

U.S. PATENT DOCUMENTS

| | | | |
|---|---|---|---|
| 4,154,983 | 5/1979 | Pedersen | 370/89 |
| 4,392,222 | 7/1983 | Ando | 370/60 |
| 4,408,323 | 10/1983 | Montgomery | 370/60 |
| 4,413,337 | 11/1983 | Dauphin et al. | 370/94 |
| 4,446,555 | 5/1984 | Devault et al. | 370/94 |
| 4,482,999 | 11/1984 | Janson et al. | 370/60 |
| 4,491,997 | 1/1985 | Frank | 370/94 |
| 4,494,231 | 1/1985 | Slawy et al. | 370/60 |

*Primary Examiner*—Douglas W. Olms
*Assistant Examiner*—Kenneth I. Rokoff
*Attorney, Agent, or Firm*—Laff, Whitesel, Conte & Saret

[57] ABSTRACT

In an integrated circuit/packet switching network comprising a plurality of nodes and one or more common access loops for inter-node network, an integrated circuit/packet switching system comprises a fixed time cycle frame format allotted to the loop or loops. Each of the nodes functions in accordance with the frame format to assemble one or more composite packets for each destination node from a plurality of circuit- and packet-switched calls designated to said each destination node and to send the assembled composite packet or packets on the loop or loops for each frame cycle time. Each node also functions in accordance with the frame format to extract self-designated composite packets among composite packets on the loop or loops and to disassemble the extracted composite packets into the constituent circuit- and packet-switched calls.

6 Claims, 25 Drawing Figures

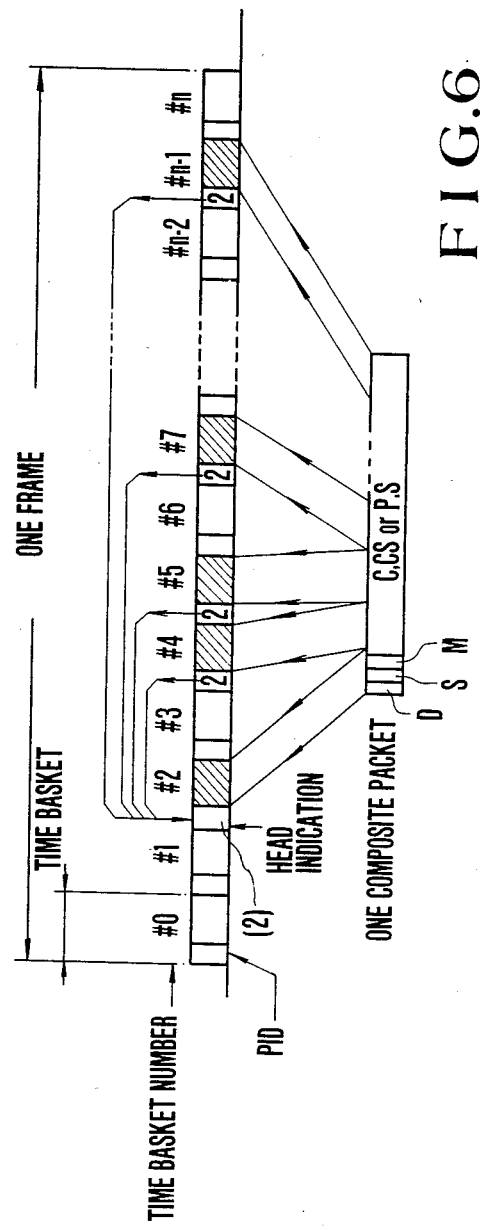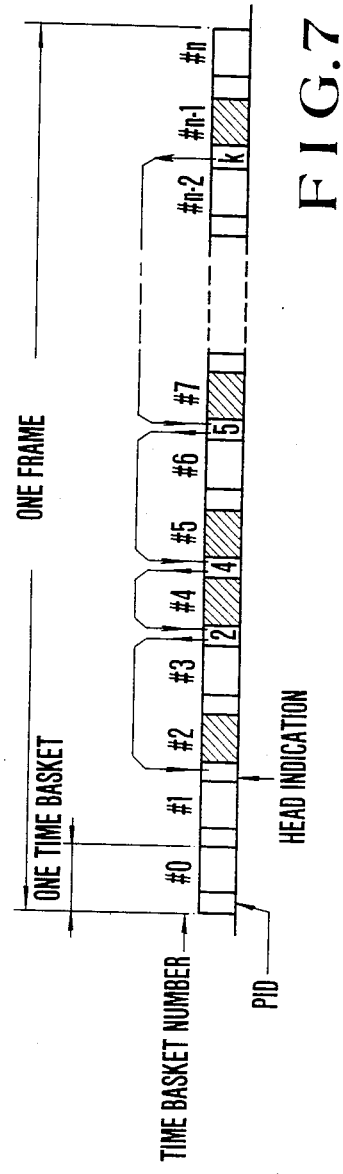

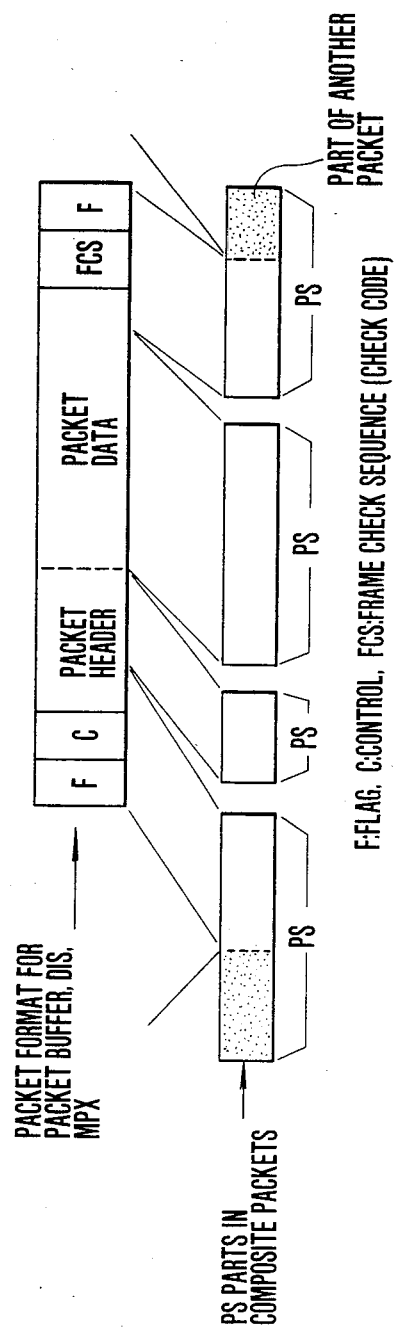
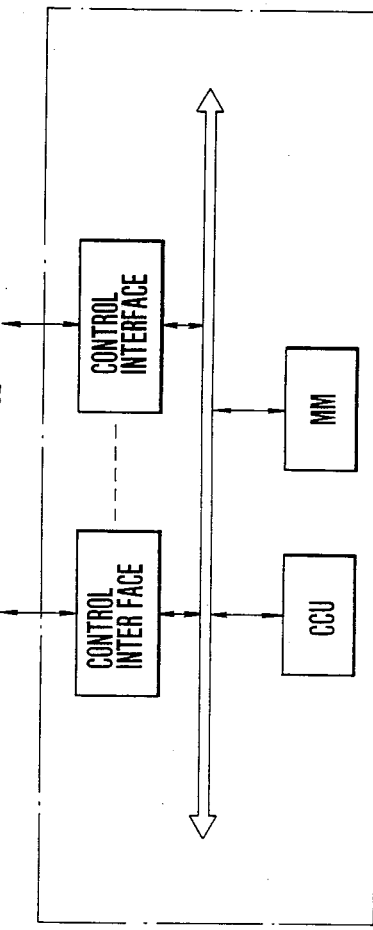

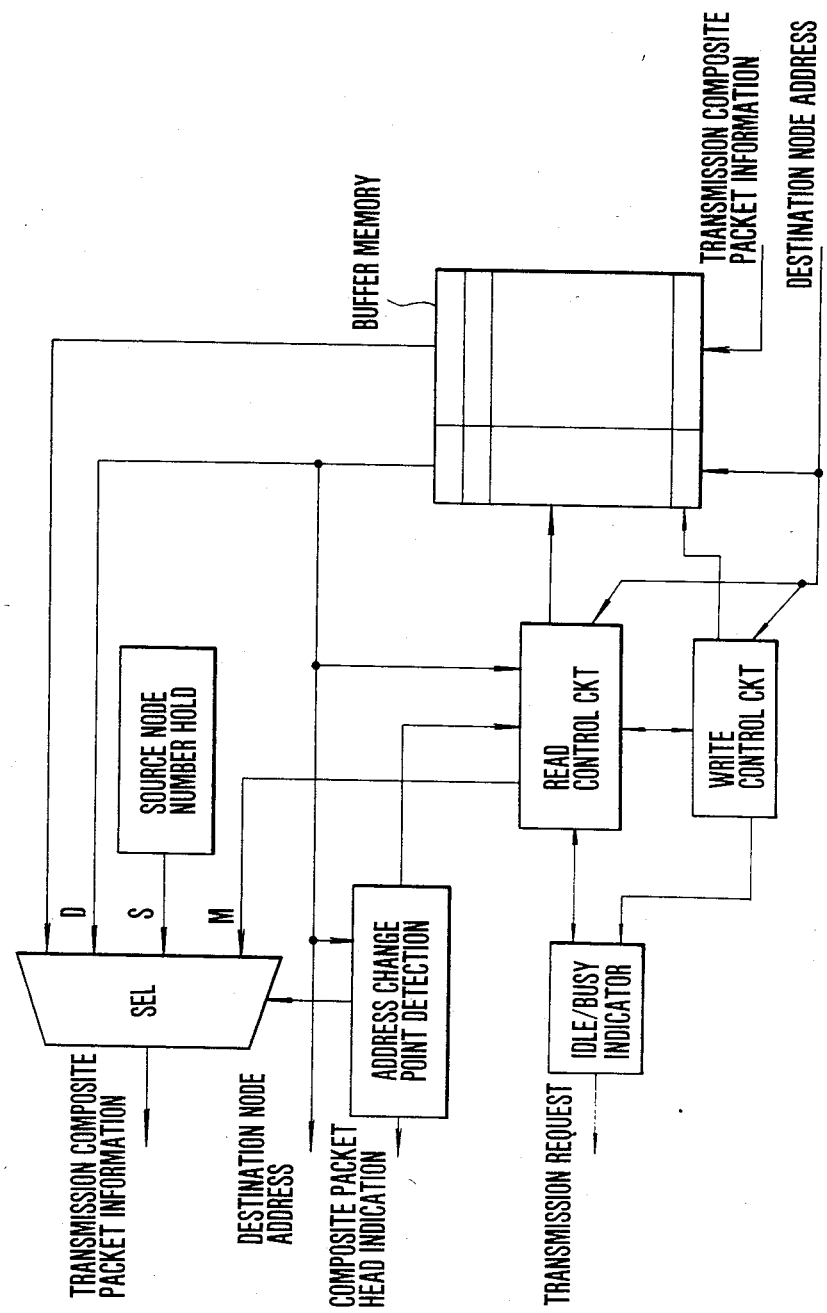

INTEGRATED CIRCUIT/PACKET SWITCHING SYSTEM

BACKGROUND OF THE INVENTION

The present invention relates to an integrated circuit/packet switching system which can handle both circuit- and packet-switching signals in an unified procedure.

As well known in the art, there are available a circuit switching system and a packet switching system.

The two switching techniques have their own merits and demerits and find different fields of applications. The circuit switching technique guarantees communication channels of given bandwidths or speeds from the start till the end of each message (or call) with a minimum of delay time and without delay time variation. Its advantages thus can be enjoyed when it is applied to data communication where data in transmitted in large quantities and continuously such as voice communication, facsimile and file transfer services. A disadvantage is that high system efficiency cannot be retained for conversation type communication services where a small amount of data occurs intermittently such as TSS (time sharing system) and information request services. The packet switching technique, on the other hand, can efficiently multiplex information by once storing information in buffer and then queuing channels. This procedure is thus suited to conversation type communication services. However, the delay time is large compared to the case of circuit switching, and also there are delay time variations. Therefore, this method is not suited for voice communication and like services.

At present, different switching systems are adopted for different kinds of services. That is, independent communication networks adopting switching systems suited for specific service categories are constructed. For example, voice communication service network (adopting circuit switching function), telex network (adopting circuit switching function), circuit switched data network and packet switched data network are constructed independently. This philosophy has an advantage that each network can be optimized for its specific service. Disadvantageously, however, there are plural independent networks, which are slightly different in architecture or performance but closely resemble one another in general aspect, partly overlap for a specified performance, leading to complicated network operation and control. In addition, since the individual networks are comparatively small in scale, a so-called aggregation effect, is impaired, leading to low efficiency of the communication facility. Besides, different networks for different service categories will present many problems when it is intended to integrate a plurality of different services to provide a composite service system. Moreover, in order to realize a novel service, it is necessary to establish a new network. Accordingly, if the circuit and packet switching functions are integrated on a single network which is suited for an extremely wide variety of communication services, great advantages will be enjoyed. To this end, it is indispensable to realize an integrated circuit/packet transmission system and integrated circuit/packed switching system in the network.

A heretofore proposed integrated circuit/packet switch module has an architecture as shown in FIG. 1. Referring to FIG. 1, discriminators 11 discriminate between circuit and packet switched calls arriving from transmission lines 10 and transmit the circuit-switched calls to a circuit switching section 13 via links 12 while transmitting the packet-switched calls to a packet switching section 15 via links 14. The circuit switching section 13 and packet switching section 15 have conventional structures. These switching sections switch the respective circuit-switched and packet-switched calls back to the discriminators 11 via the links 12 and 14. The discriminators 11 send out both these calls to the corresponding transmission lines 10. The architecture of the discriminator 11 varies with the manner, in which circuit- and packet-switched calls are integrated on the lines 10. At any rate, the principle is to separate incoming circuit- and packet-switched calls from the lines or, conversely, sent out both the calls in an integrated form to the lines.

With the scheme of FIG. 1, however, although both the circuit switching and packet switching may be realized physically in the same switch module, the two are logically entirely not realy integrated but are distinct from one another. More specifically, the circuit switching section and packet switching section must be designed independently in compliance with the characteristics of the processed circuit- and packet-switched calls. Therefore, overlapped function and equipment still exist and the system efficiency is low, and the merits of the integration of circuit and packet switching functions noted above can be hardly obtained.

Meanwhile, there have been attempts to process both circuit- and packet-switched calls on the same network, e.g., in-house private networks and especially local area networks (LAN) which are recently attracting great interest. Therefore, it is conceivable to construct a speech path network of an exchange after local area networks. FIG. 2 shows an architecture, which comprises a plurality of modules (hereinafter referred to as nodes) 20 each accommodating a number of user access lines and/or inter-office trunks and a plurality of loops 21 for inter-node network. Following the conventional local area network scheme, the individual loops 21 operate with a fixed cycle time frame format, as shown in FIG. 3. The frame contains a plurality of time slots. These time slots are split into those for circuit-switched calls and those for packet-switched calls. Each node receives and transmits circuit-switched calls using time slots alloted thereto and packet-switched calls using time slots alloted thereto. Each circuit-switched call is sent on the loops using the same time slots in each frame while the communication circuit is set up. On the other hand, each packet-switched call is sent on the basis of one of well-known time slot access algorisms (e.g., token passing method).

In this approach, if the time slot shares for circuit- and packet-switched call are fixed, idle time baskets for the call of one category cannot be used for a call of the other category, leading to reduced system efficiency. In addition, although the circuit switching and packet switching are physically integrated, the two are logically entirely distinct from one another. The technique thus does not substantially differ from the approach shown in FIG. 1, and the merits of the integration of circuit switching and packet switching cannot be obtained. A movable boundary system, in which the time slot shares are variable, can allot time slots according to the circuit- and packet-switched call traffic amounts to alleviate the system efficiency decrease due to loss. In this case, however, a control node is needed, which specifies the boundary by observing both call category trafic amounts. Or, where there is a control node, the function noted must be additionally provided thereon. However, instantaneous observation of the trafic is impossible, so that it is impossible to instantaneously vary the time slot shares to reduce the loss to zero. This inefficiency essentially arises from specifically alloting the time slots for circuit- and packet-switched calls.

There have been some proposals with an aim of real integration of both switching functions. One approach is to integrate all commuication services by the packet switching technique, the services including even voice and like services, for which the circuit switching technique has been thought to be suited. When applied to voice communication service, digitized voice information generated in a predetermined interval of time is assembled into a packet, which is transmitted to the destination by the conventional packet switching procedure. Each packet is provided with a header, which contains destination address, logical channel number and other control data. The packet is transmitted to the destination by reference to the header. In this case, the size of one packet must be sufficiently large to minimize the transmission efficiency decrease due to the header. Therefore, the delay time due to packet assembly time (i.e., time necessary for storing an amount of information corresponding to a packet having a predertermined size) is large for voice communication services. In addition, packets are once stored and set on after having succeeded in hunting idle channels. This means that the queuing time varies with packets of even the same channel message or call. Therefore, for voice communication or like services which require time transparency (a character that the delay time is constant), a receiving buffer for absorbing delay time variations is necessary, which further increases the delay time. In a network which covers a broad geometrical area so that a call from a source to a destination may be relayed by a number of excahnge offices, increased delay times in the individual offices may amount to a very large absolute delay time to cause an echo or deteriorate the message quality. In order to reduce delay time, it is necessary to reduce the packet assembly time by reducing the packet length and also reduce the capacity of the delay absorption buffer. Doing so, however, leads to transmission efficiency decrease and message quality deterioration due to packet loss.

Another approach is to adopt the circuit switching technique for integration of circuit- and packet-switched calls even for services, for which the packet switching technique is thought to be suited. An example of this approach is a fast circuit switching system. In this system, a circuit is set up for each of intermittently transmitted pieces of information of a call and is cleared down as soon as the transmission is over. This procedure can avoid channel holding overhead and improve the system efficiency. A significant point to this system is the fastness with which to set up and clear down the circuit. In a network covering a broad area, however, a communication circuit between a source and a destination must be set up and cleared down via a number of exchange offices, and it is actually extremely difficult to set the circuit set-up and clear-down time to be very small compared to the actual transmission period, during which the channel is occupied by the transmitted information. Efficiency decrease of the channel is thus inevitable. Further, in a heterogeneous traffic processing network covering a wide variety of bandwidth (or speed) services, such controls as securing necessary bandwidth or speed channels for each call over the entire route and assembling a plurality of secured unit bandwidth or unit speed channels into a call are independently required for each service category. The control involved thus is extremely complicated, leading to scale and complexity increase of the switching system hardware and software.

The drawbacks in the prior art discussed above are summarized as follows.

(1) Real integration of the circuit and packet switching functions lacks, so that the merits of the integration such as improved facility efficiency and unified operation and control cannot be obtained (in case of coexistent circuit/packet switching techniques).

(2) Delay time is large for circuit-switched channels such as voice services (in case of integration by packet switching technique).

(3) Time transparency lacks for circuit-switched channels such as voice services (in case of integration by packet switching technique).

(4) System efficiency is inferior for communication services wherein occurrence of transmission data is intermittent (in case of integration by circuit switching technique).

(5) Control of heterogeneous traffic networks is complicated (in case of integration by circuit switching technique).

SUMMARY OF THE INVENTION

An object of the invention is to provide an integrated circuit/packet switching system, which can overcome the drawbacks noted and realy integrate the circuit and packet switching functions, leading to less delay time and guaranteeing time transparency for circuit-switched calls, retaining system efficiency for intermittent communication services and providing for unified procedure for heterogeneous traffic channels.

According to one feature of the invention, in an integrated circuit/packet switching system comprising a plurality of nodes and one or more common access loops for inter-node network, there is provided an integrated circuit/packet switching system comprising a fixed time cycle frame format allotted to the loop, each of the nodes functioning in accordance with the frame format to sort circuit- and packet-switched calls incoming from user access lines and/or inter-office trunks for individual destination nodes for each frame cycle time, to assemble one or more composite packets for each destination node from a plurality of circuit- and packet-switched calls designated to each destination and to send the assembled composite packet or packets on the loop or loops for each frame cycle time, each node also functioning in accordance with the frame format to extract self-designated composite packets among composite packets on the loop or loops and to disassemble the extracted composite packets into the constituent circuit- and packet-switched calls and to send the separated circuit- and packet-switched calls to corresponding user access lines and/or inter-office trunks.

According to another feature of the invention, in an integrated circuit/packet switching system comprising a plurality of nodes and one or more common access loops for inter-node network, there is provided an integrated circuit/packet switching system comprising, a fixed time cycle frame format allotted to the loop, each of the nodes functioning in accordance with the frame format to sort circuit-switched calls incoming from user access lines and/or inter-office trunks for individual destination nodes for each frame cycle time, to assemble one or more circuit-switched composite packets from a plurality of circuit-switched calls for each destination node and to send the assembled circuit-switched composite packets on the loop or loops, while sorting packet-switched calls incoming from user access lines and/or inter-office trunks for individual destination nodes, assembling one or more packet-switched composite packets for each destination node and sending the assembled packet-switched composite packet or packets on the loop or loops, each node also functioning in accordance with the frame format to extract self-designated circuit- and packet-switched composite packets among circuit- and packet-switched composite packets on the loop or loops, to disassemble the extracted circuit- and packet-switched composite packets into the constituent circuit- and packet-switched calls and to send the separated circuit- and packet-switched calls to corresponding user access lines and/or inter-office trunks.

According a further feature of the invention, in an integrated circuit/packet switching system comprising a plurality of nodes and one or more common access loops for inter-node network, there is provided an integrated circuit/packet switching system, comprising a fixed time cycle frame format allotted to the loop, each of the nodes functioning in accordance with the frame format to sort circuit-switched calls incoming from user access lines and/or inter-office trunks for individual destination nodes for each frame cycle time, to assemble one or more circuit-switched composite packets from a plurality of circuit-switched calls for each destination node and to send the assembled circuit-switched composite packets on the loop or loops, while assembling packet-switched non-composite packets from packet-switched calls incoming from user access lines and/or inter-office trunks and sending the assembled packet-switched non-composite packets on said loop or loops, each node also functioning in accordance with the frame format to extract self-designated circuit-switched composite packets and packet-switched non-composite packets among circuit-switched composite packets and packet-switched non-composite packets on the loop or loops, and to disassemble the extracted circuit-switched composite packets and packet-switched non-composite packets into the constituent circuit- and packet-switched calls and to send the separated circuit- and packet-switched calls to corresponding user access lines and/or inter-office trunks.

The above and other objects, features and advantages of the invention will become more apparent from the following description of the preferred embodiments thereof, when the same is read with reference to the accompanying drawings.

BRIEF DESCRIPTION OF THE DRAWINGS

FIGS. 6 and 7 are views showing the manner, in which the frame according to the invention is used;

FIGS. 10 through 17 are block diagrams showing components in the node shown in FIGS. 8 and 9 in detail;

DESCRIPTION OF THE PREFERRED EMBODIMENTS

Figure 1:
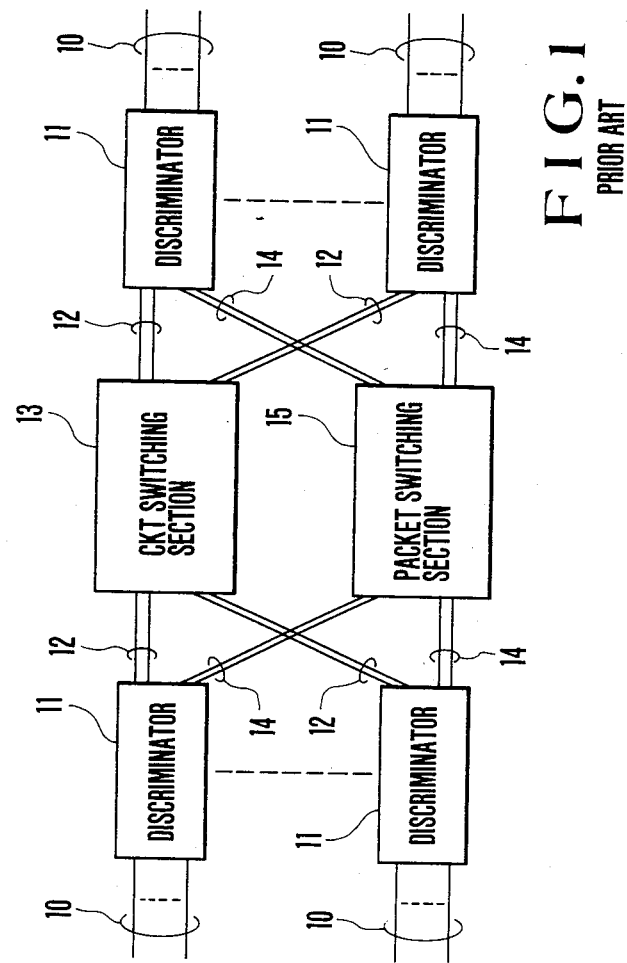
FIG. 1 is a block diagram showing a prior art integrated circuit/packet switching module.
Figure 2:
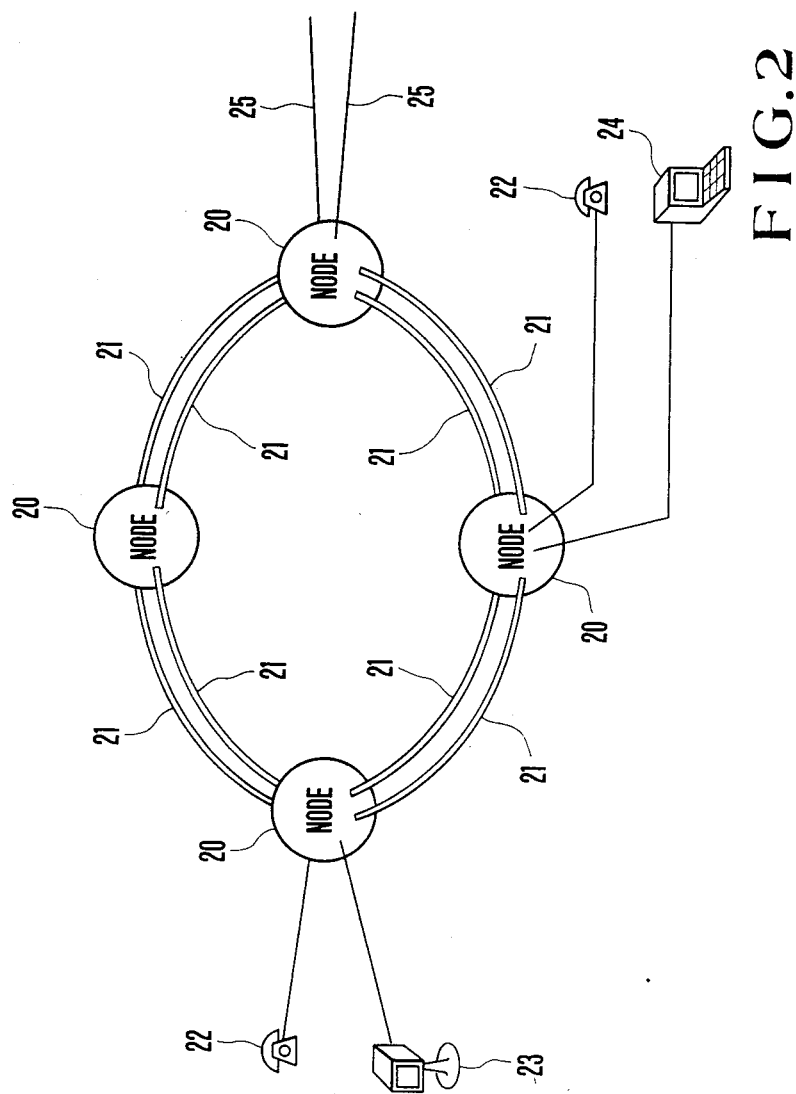
FIG. 2 is a schematic representation of an integrated circuit/packet switching system constructed after a prior art local area network.
Figure 3:
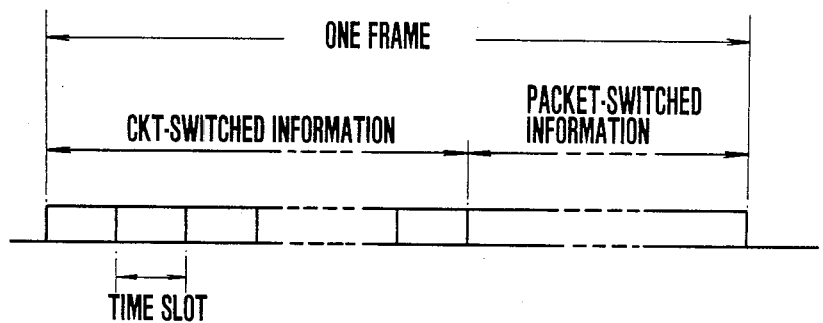
FIG. 3 is a view showing the configuration of a frame in the prior art system of FIG. 2.
Figure 4:
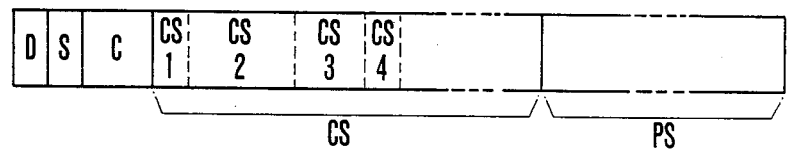
FIG. 4 is a view showing a configuration of a composite packet according to an embodiment of the invention.

The invention is realized on a switching network architecture shown in FIG. 2, comprising a plurality of nodes 20 and one or more loops 21 for inter-node network. The nodes 20 each accommodate a plurality of user access lines of user terminals 22, 23, 24 and/or inter-office trunks 25. Calls from these lines and trunks are transmitted to other nodes and then sent to designated lines and/or trunks. A number of messages or calls of a wide variety of categories, e.g., voice, data, image and circuit- and packet-switched modes are simultaneously and distributedly controlled. The circuit- and packet-switched modes are respective forms or categories of call switching. Each node 20 sorts a number of calls in accordance with different destination nodes for each predetermined common period to the nodes, e.g., 125 μsec, which is a standard voice information encoding cycle period, and assembles a plurality of sorted pieces of information for the individual destination nodes into a composite packet as shown in FIG. 4. The format of the composite packet shown in FIG. 4 consists of a destination node address part D, a source node address part S, a control signal part C, a circuit-switched information part CS and a packet-switched information part PS. The circuit-switched information part CS generally consists of a plurality of circuit-switched information pieces CS1, CS2, CS3, . . . Each information piece shares a definite time space in the composite packet for each cycle depending on its bandwidth (or speed). This is made so because a fixed amount of circuit-switched information corresponding to the bandwidth thereof arrive at the node for each fixed cycle period and has to be all sent to the destination node without being retained in a buffer memory or the like in the next cycle. If the cycle time of the format of FIG. 4 is 125 μsec (=⅛ kHz), the information piece CS1 shares a time space of 8 bits if it is 64-kbit/sec PCM voice, and CS2 shares 24 bits if it is 192-kbit/sec high speed facsimile information. When a new circuit-switched call occurs, a corresponding information time space is added to the trailing end of the circuit-switched information part CS. When a call is over, the corresponding time space is deleted from the part CS, and the following information is carried up. The control signal part C accommodates control signals for inter-node control message such as the establishment and release of circuit-switched channel, necessary bandwidth, originating/terminating subscriber information, etc. It also accommodates information of the boundary between the circuit- and packet-switched information parts. Control signals concerning the establishment and release of a packet-switched channel are usually contained in a header of the packet, but the function thereof may be partly realized by the control signal part.

The packet-switched information part PS consists of packet-switched information pieces. In the packet-switched call, information pieces arriving at the node in the fixed cycle time noted above need not be sent out in the next cycle but can be stored in buffer memory. Thus, the length of the packet-switched information part PS may be varied depending on the amount of arriving information and the congestion of the loop or loops. Generally, a plurality of packet-switched information pieces are found in a mixed or multiplexed form in the packet-switched information part PS. The packet-switched information part PS thus can be regarded as a packet multiplexed channel having variable capacity. When there is no circuit-switched channel or packet-switched channel between particular nodes, a composite packet without the circuit- or packet-switched information part CS or PS is naturally produced between the nodes. The destination and source node address parts D and S respectively accommodate the address numbers of the destination node and source node, i.e., the node in which the composite packet is produced.

Each node sends out composite packets of the format as described to the loop or loops for every cycle time. Also, it detects and extracts self-designated composite packets among a number of composite packets transmitted on the loop or loops. In this way, communication between nodes is realized.

With the system as described, a constant amount of circuit-switched information corresponding to the bandwidth or speed thereof can be transmitted and received for each cycle time so that the inter-node delay time is fixed, that is, time transparency for circuit-switched information is guaranteed. In addition, the share of the header (i.e., addresses, control signals, etc.) is reduced because it is provided for a plurality of circuit- and packet-switched calls. Thus, sufficient system efficiency can be retained even if the information of each call in the composite packet is not so much. This permits reduction of the delay time due to the packet assembling time. For example, if the composite packet assembling/disassembling and switching cycle period, i.e., the interval of the format of FIG. 4, is 125 μsec and the circuit-switched call information part CS has 80 bits for 10 voice calls and the packet-switched call information part PS has 80 bits, the conventional system, in which one packet is only constructed with one voice call, requires 160 bits, i.e., a packet assembling time of 2.5 m sec, for substantially the same order of efficiency decrease due to the header for voice service. With the composite packet system according to the invention, the delay time can be greatly reduced compared to the conventional packet switching system.

Further, in case of a heterogeneous traffic network accommodating different bandwidth or speed channels, a definite collective time space corresponding to the bandwidth or speed may be provided in the composite packet as shown in FIG. 4. Such complicated control as assembling a plurality of unit bandwidth or speed spaces in to a call is thus unnecessary.

Further, with this system circuit- and packet-switched calls can be controlled in a unified procedure in the form of composite packets.

Figure 5:
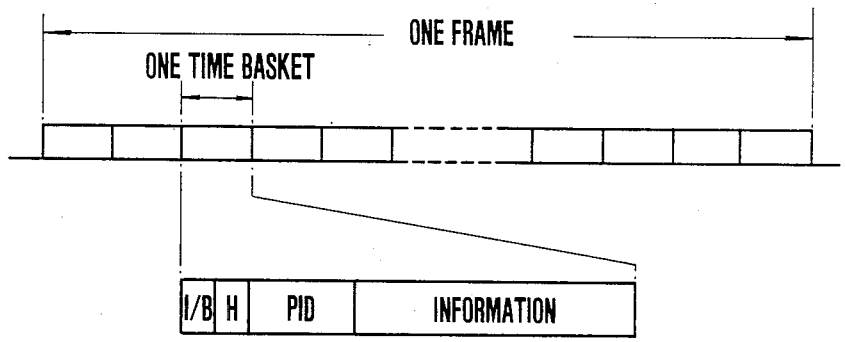
FIG. 5 is a view showing a configuration of a frame according to the invention.

Now, the procedure of transmission and reception of composite packets between nodes for each cycle, will be described. In the structure comprising a plurality of nodes and one or more loops for inter-node network as shown in FIG. 2, each loop is designed such that signal executes one excursion along the loop in the composite packet assembling/disassembling and switching time noted above, e.g., 125 μsec. Such delay time control function is provided on one of the nodes, or a dedicated node for delay time control is provided. Each loop thus operates at regular recurring frames. One frame is equal to the loop excursion time, e.g., 125 μsec. The frame is split into a plurality of large time slots, which are called time baskets hereafter, as shown in FIG. 5. In the configuration shown in FIG. 5, frame synchronization pattern bits are omitted. Each node divides the composite packet into time basket size segments, observes the frame from the head thereof and send the divided composite packet segment by segment on a loop every time it succeeds in hunting an idle time basket. Idle time baskets used for sending the composite packet includes those obtained when baskets of self-designated composite packets are extracted. One composite packet thus is transmitted using a plurality of intermittent time baskets in one frame. In case of a composite packet having a large amount of information, all the idle time baskets in one frame may be used for its transmission.

Each time basket includes some indicator parts for indication as to whether it is idle or busy and its discrimination among a plurality of simultaneously communicating composite packets. FIG. 5 shows an exemplary time basket format. The time basket has a header part consisting of an idle/busy indicator I/B, a composite packet head indicator H and a composite packet indicator PID. The idle/busy indicator I/B indicates that the time basket is idle or busy. Each node observes this part of each time basket. When it detects an idle time basket, it changes the idle/busy indicator thereof to "busy", and then sends a time basket size composite packet segment on this time basket. On the other hand, when the node does not use an arriving self-designated composite packet segment time basket for the sending of a composite packet, it writes "idle" in the idle/busy indicator I/B of that time basket. In the composite packet head indicator H, "1" is written, for instance, if the time basket contains a head part of a composite packet to be sent, while "0" is written otherwise. On the receiving side, the head indicator H of each "busy" time basket is observed. If the head indicator is indicating that the time basket is the head part of a composite packet, the destination node address part D (see FIG. 4) contained in a head portion of this time basket is observed. If the address is the own address of the node, the following source node address part S, control signal part C, circuit-switched information part CS, etc. are extracted. In this way, the head time basket of a self-designated composite packet can be detected and extracted.

In the packet indicator PID, a number alloted to the pertinent composite packet is written. For example, a basket number of a leading time basket of a composite packet is written in the packet indicator PID of the time baskets which contain the composite packet. FIG. 6 shows an example of use of a frame for composite packet transmission. The composite packet is transmitted in intermittent time baskets #2, #4, #5, #7, . . . , #n−1 on a certain loop. The head time basket number #2 is written in the packet indicator PID of these time baskets, and the head indication is made in the head indicator H of the time basket #2. An indication "busy" is of course written in the idle/busy indicator I/B of these time baskets. On the receiving side, the self-designated composite packet head time slot is detected by observation of the composite packet head indicator and destination node address as mentioned above, and its number is memorized. Once this is done, the follwoing intermittent time baskets having the same number in the packet indicator PID thereof can be extracted to reproduce the original composite packet. In the packet indicator PID of the head time slot, any suitable form of message may be written, but the own time slot number written as message can indicate by itself that the time basket is the head of a composite packet. This arrangement permits omission of the composite packet head indicator H. There may be cases where the nodes include a special node, which has the role of controlling the operation of the entire swithcing system, and special time baskets that cannot be used for communication between regualr nodes are alloted exlusively for communication between the special node and each regular node. Or there may be cases where there are time basket numbers for time baskets which do not actually exist. In such cases, their time bacekt numbers may be written in the composite packet indicator PID as an alternative method of idle/busy indication, so that the indicator I/B may be omitted to reduce the frame overhead.

As a further alternative method of composite packet indication, the basket number of the immediately preceding time basket carrying the same composite packet may be written in the packet indicator PID of each time basket. FIG. 7 illustrates this method in an example of use of a frame similar to the case of FIG. 6 where time baskets #2, #4, #5, #7, . . . , #n−1 on a certain loop are used for a composite packet transmission. As is shown, the basket number of the immediately preceding time basket is written in the packet indicator PID of each time basket. On the receiving side, when the head time basket is detected, this time basket number in the packet indicator PID is observed to detect the next time basket. If it is detected, then, its number is observed to detect the next time basket. The composite packet thus can be reproduced substantially in the same way as in the case of FIG. 6. In this arrangement, the basket number of the trailing end time basket in the frame (i.e., #n in FIG. 7) is never written in packet indicator PID because one composite packet is contained in one frame. Therefore, this basket number may be used in lieu of the idle/busy indication or composite packet head indication. Further, where there are time baskets and/or time basket numbers that are not used between regualar nodes, such basket numbers again may be used in lieu of the idle/busy indication or composite packet head indication.

As a still further alternative method of composite packet indication, individual composite packets may be allotted different numbers, which are written in the composite packet indicator PID. In this alternative case, either specified numbers may be used for individual communicating node pairs or, alternatively, before the transmission and reception of composite packet are started between nodes, the loop therebetween may be observed and available remaining numbers for use may be selected for use. In a typical example of the former case, the aggregate of the destination and source node addresses may be used as specified number.

Further, the individual tansmitting/receiving node pairs may be allotted with specified numbers independently of the node addresses. In this cases, the length of the composite packet indicator PID may be reduced by about one bit compared to the case of using the aggregate of node addresses. In these methods, information concerning the destination and source node addresses is contained either directly or indirectly in the packet indicator PID, so that it is possible to omit the destination and source node address parts D and S from the composite packet configuration shown in FIG. 4.

In the case of selecting available remaining numbers by observing the loop before the start of the transmission of composite packet, a procedure of declaring the relation between a selected number and the addresses of the pertinent composite packet transmitting/receiving node pair to other nodes and procedure of preventing overlaping with similar selected number declarations from other nodes are necessary. However, once the declaration is suceeded, the composite packet can be discriminated only from the selected number. Thus, the address parts D and S again can be omitted from the composite packet format. Further, it is possible to provide specified numbers and use them in lieu of idle indication and omit the idle/busy indicator I/B. Moreover, since the time basket, in which the specified number first appears in the packet indicator PID among the time baskets in a frame, is the head time basket for the pertinent composite packet, the composite packet head indicator H need not be provided in this procedure.

In any of the procedures described above according to the invention, each time basket has an idle/busy indication in some form, and each node selects the required number of idle time baskets (including those which are made converted from self-destinated time baskets) from the head of a frame for sending a composite packet. When there is much information to be transmitted, therefore, all the idle time baskets may be used to send the composite packet. Thus, circuit- and packet-switched calls need not be discriminated, but loop tramsimmsion capacity can be utilized 100%, so that very high system efficiency can be ensured. when the amount of information to be transmitted is greater than available idle time baskets, the overflow information is sent as a next frame composite packet by queuing the next frame. The length of a composite packet is thus variable depending on the amount of information to be transmitted and the number of available idle time baskets. According to the invention, however, it is only the packet-switched information part PS (see FIG. 4) in a composite packet, for which the queuing may be done depending on the number of available idle time baskets, and the circuit-switched information CS can always be transmitted each frame. The reason for this will now be described. It is assumed that the circuit-switched channels have the same communication speed in the opposite directions.

According to the invention, time required for one excursion along each loop is set equal to one frame as mentioned before. All time baskets in the frame, therefore, are always on the loop and circulated past the successive nodes with the lapse of time. The consecutive time baskets of the frame thus are similar to a belt conveyor running past the successive node. Among these time baskets, those which are self-addressed to an node are cleared and become idle time basket at that node, so that they can be reused for composite packet sending from that node. Therefore, when there are n self-addressed time baskets in a frame, at least n time baskets may be used for sending information from the node because there are generally other idle time baskets in the frame. When nodes A and B intend to start circuit-switched channel transmission using one time basket between them, the node A observes the time baskets on a loop, hunts an idle time basket and tries to send a composite packet having the format of FIG. 4. In the control signal part C of this composite packet, a message to the node B, indicating that this time basket is used for the circuit-switched channel, is contained. The node B receives this part of composite packet, decodes the message, and similarly tries to send a composite packet addressed to the node A by hunting an idle time basket. The decoding of the message is generally done after reception of the composite packet information from the node A. Therefore, the incoming time basket connot be immediately reused for the transmission of composite packet form node B to node A, but the node B also has to hunt an idle time basket. Subsequently, the nodes A and B try to transmit one time basket of composite packet to each other each frame. Once either one of the two nodes succeeds in transmission, the other node also can transmit by the mechanism discussed above. The two nodes thus can subsequently continue to send composite packets to each other at least one time basket each frame. That is, one time basket can be exclusively used between the nodes A and B over the whole loop. In this way, the right to frame-by-frame transmission necessary for the circuit-switched channel can be ensured continously. An increase of time baskets necessary for the circuit-switched channel transmission/reception may be similarly secured by inter-node prearrangements using the control signal part C and hunting of the required number of idle time baskets by the two nodes on the basis of the prearrangements. Once the composite packet transmission/reception mode using a predetermined number of time baskets is set up between the nodes A and B, the frame-by-frame transmission and reception of circuit-switched information between the two nodes can be sustained without being interrupted by accesses from other nodes without requiring any special control. From the start of hunting for an idle time basket till the establishment of the bidirectional circuit-switched channel communication status, there exists an idle time space in the transmitted composite packet. This space may be filled by sending packet-switched channel information.

Generally, each node send a plurality of composite packets for different destination nodes each frame, so first the circuit-switched information CS and then packet-switched information of each composite packet must be sent.

When there is a communication status between nodes, the address parts D and S and control signal part C in the composite packet format shown in FIG. 4 must always be sent each frame (although the address parts D and S may be omitted in the third composite packet indication method as mentioned earlier). These parts, however, may be considered to be included in the circuit-switched information part in handling.

The description so far has assumed for the sake of simplicity that each node sends a composite packet to an other node on a single loop for each cycle time. In this case, if there is much information to be transmitted between a specific node pair, it is readily possible to produce a plurality of composite packets between the nodes and send them on separate physical loops, thereby securing the necessary communication capacity. Actually, however, a plurality of physical loops may be used for inter-node network. In such a case, the various methods described above may be applied by regarding the loops as a single logical loop.

Figure 8:
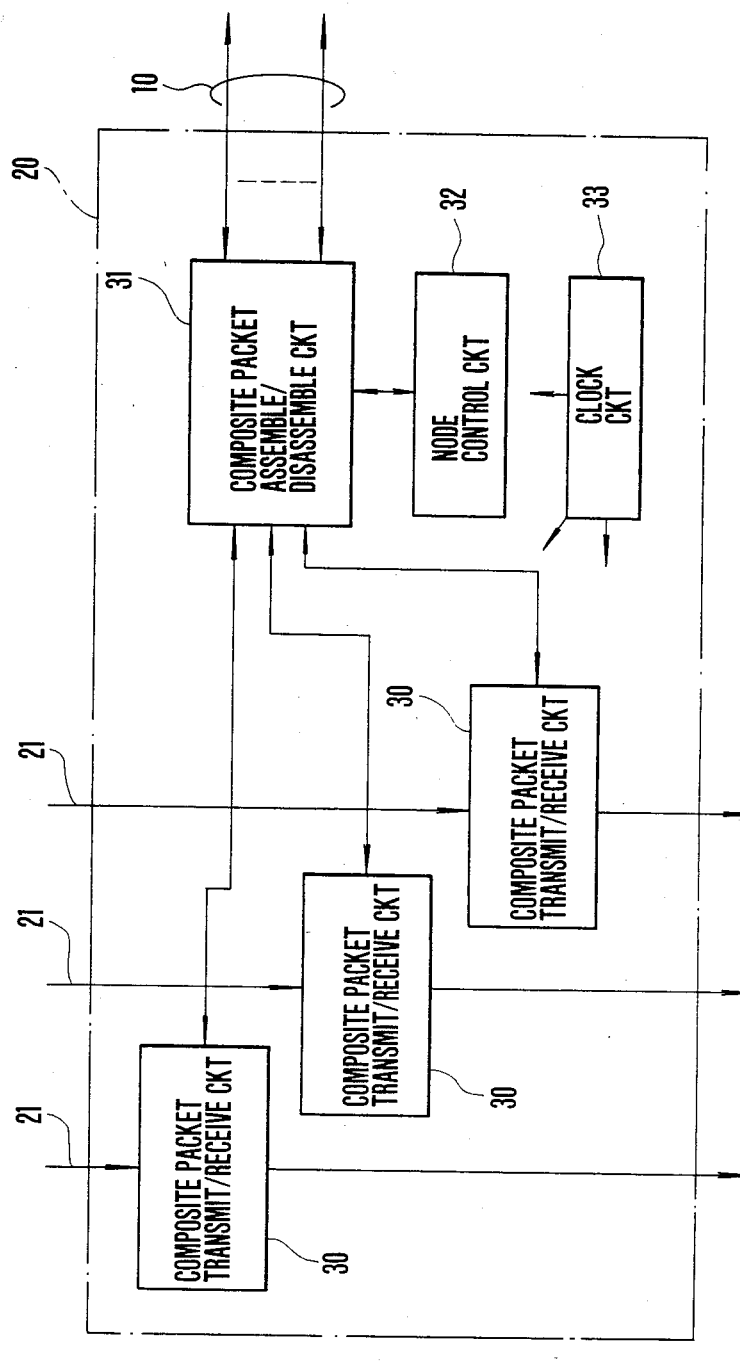
FIGS. 8 and 9 are block diagrams showing an example of node according to the invention.
Figure 9:
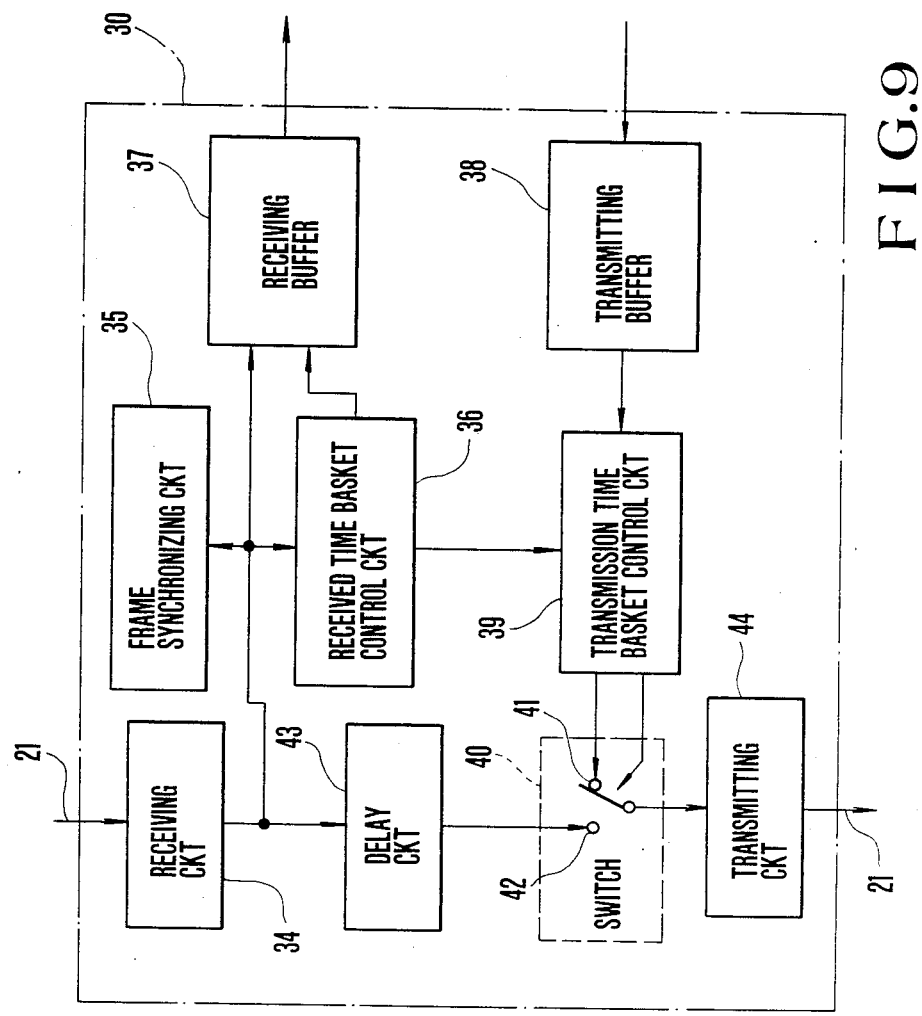

FIGS. 8 and 9 show a specific example of the node construction according to the invention. This example is applied to a system in which a composite packet is sent on a single loop. Referring to FIG. 8, the node 20 includes a plurality of composite packet transmit/receive circuits 30 provided for respective loops 21. Each of these circuits 30 extracts self-addressed composite packets from the associated loop and also sends out composite packets addressed to other nodes to the loop in any one of the procedures described before. A composite packet assemble/disassemble circuit 31 assembles circuit- and packet-switched calls arriving from transmission lines 10 into composite packets for different destination nodes and transmit each of these composite packets to each of the composite packet transmit/receive circuits 30. At the same time, it receives self-addressed composite packets extracted from loops 21 by composite packet transmit/receive circuits 30, disassembles the received composite packets into original circuit- and packet-switched calls and send out these calls to corresponding transmission lines 10. A node control circuit 32 executes control operations of the node including generation and analysis of the control signal part C (see FIG. 4) of transmitted and received composite packets. A clock circuit 33 generates an internal node operation clock synchronized to a basic system clock and also various timing signals for the node. The clock synchronization is well known to those skilled in the art, so it will not be described.

FIG. 9 shows the detailed structure of the composite packet transmit/receive circuit 30 shown in FIG. 8. Referring to the Figure, a receiving circuit 34 receives, equalizes and amplifies signal transmitted on the loop 21 from other nodes to reproduce digital signal. A frame synchronizing circuit 35 detects a frame head from the reproduced digital signal and generates various timing signals for the operation of the circuit 30 according to the detected frame head. Under the control of these timing signals, a received time basket control circuit 36 observes the idle/busy indicator I/B, composite packet head indicator H and composite packet indicator PID of the received time baskets, detects self-addressed composite packet time baskets and writes the detected contents into a receving buffer 37. Generally, a plurality of self-addressed composite packets are simultaneously communicating, so that the writing of data into the buffer is done while sorting the time baskets for the individual composite packets. The composite packet informtion written in the receiving buffer 37 is transferred to the composite packet assemble/disassemble circuit 31. Meanwhile, composite packet information transferred from the composite packet assemble/disassemble circuit 31 is stored once in a transmitting buffer 38 and sent on the loop under the control of a transmission time basket control circuit 39. The received time basket control circuit 36 detects idle time baskets as well as the self-addressed composite packet time baskets and notifies the transmission time basket control circuit 39 of both these time baskets which can be used for composite packet transmission. When composite packet information is present in the transmission buffer 38, the transmission time basket control circuit 39 sends the informtion on time baskets according to the notification from the received time basket control circuit 36. At this time, necessary data is written in the idle/busy indicator I/B, composite packet head indicator H and composite packet indicator PID of the individual time baskets in the procedure as described. When no composite packet information to be transmitted is present although time baskets usable for transmission are available, an indication "idle" is written in the idle/busy indicator I/B of the available time baskets. When writing data into the indicator PID and sending composite packet time baskets, a switch 40 is set to an insert terminal 41 under the control of the tansmission time basket control circuit 39. The switch 40 is set to a pass terminal 42 to pass busy time baskets of composite packets designated to other nodes. A delay circuit 43 makes up for a delay time until the analysis of the indicator data in each time basket by the received time basket control circuit 36 and writing of new indicator data by the transmission time basket control circuit 39 are over. The information selected by the switch 40 is sent out through a transmitting circuit 44 to the loop 21 again to be transmitted to the next node.

Now, the individual components of the circuits of FIGS. 8 and 9 will be described.

Figure 10:
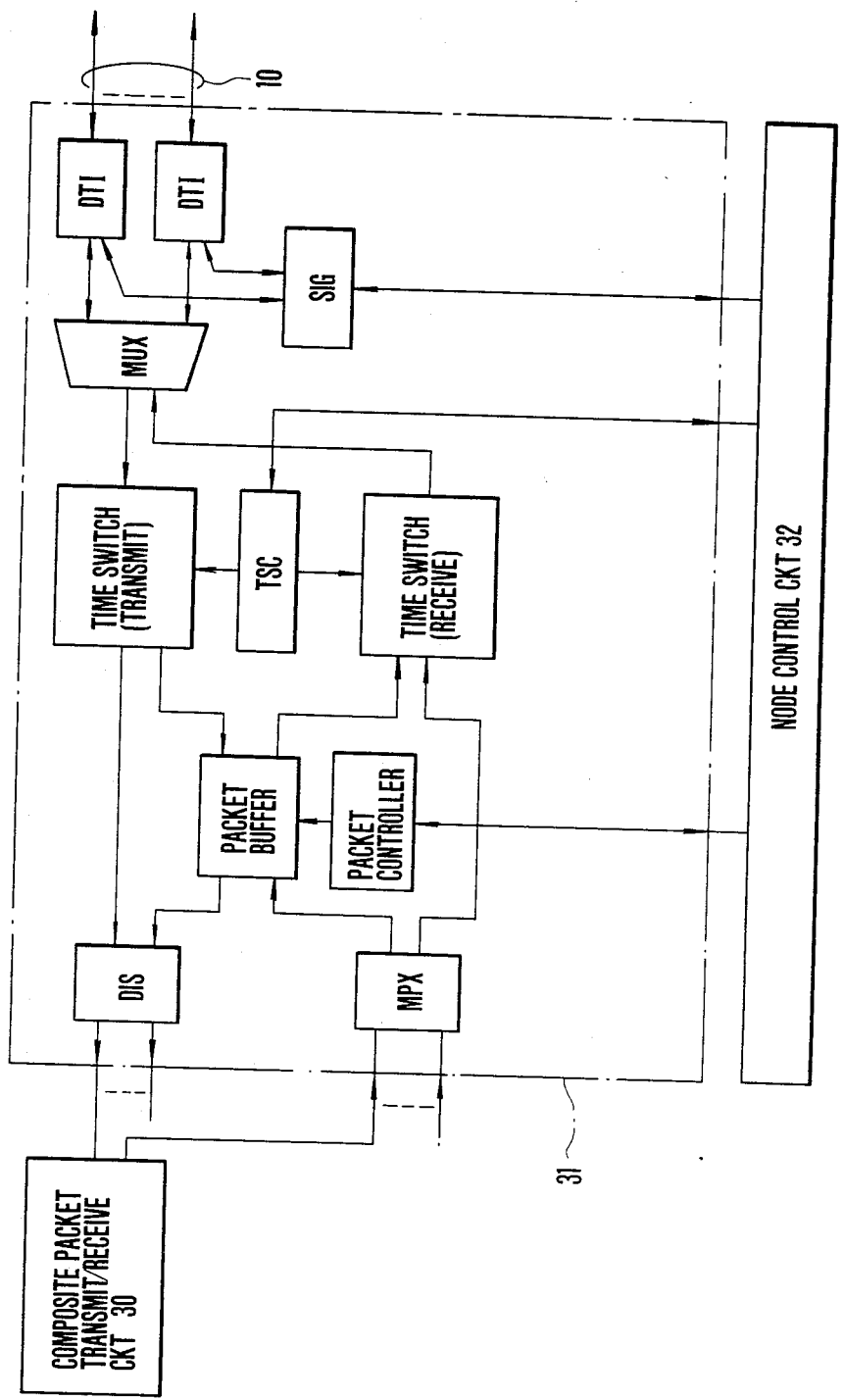

FIG. 10 shows the composite packet assemble/disassemble circuit 31. The transmission lines 10 are digital time division multiplex lines, on which circuit- and packet-switched calls are transmitted simultaneously. Digital transmission interfaces DTIs have frame synchronization and inter-office signal insertion/extraction functions. A signal processing circuit SIG processes inter-office signaling messages by communicating with the node control circuit 32. A multiplexer/demultiplexer MUX multiplexes and demultiplexes calls onto a plurality of transmission lines. A time switch on transmitting side is a sort of memory, as shown in detail in FIGS. 11a and 11b. It separates circuit- and packet-switched calls and sorts circuit-switched calls for different destination nodes. The packet-switched calls are transferred to a packet buffer for packet processing and then sorting for different desitination nodes. The sorted circuit- and packet-swtiched calls for the individual destination nodes are distributed through a distribution circuit DIS to correspoding composite packet transmit/receive circuits 30. The processing on the receving side is converse to that on the transmitting side. A time switch controller TSC provides write/read addresses for the time switch operation.

FIG. 12 shows the node control circuit 32. It executes control operations within the node and participates in the distributed control of the nodes. It consists of a central control unit CCU, a main memory MM and control interfaces.

Figure 11A:
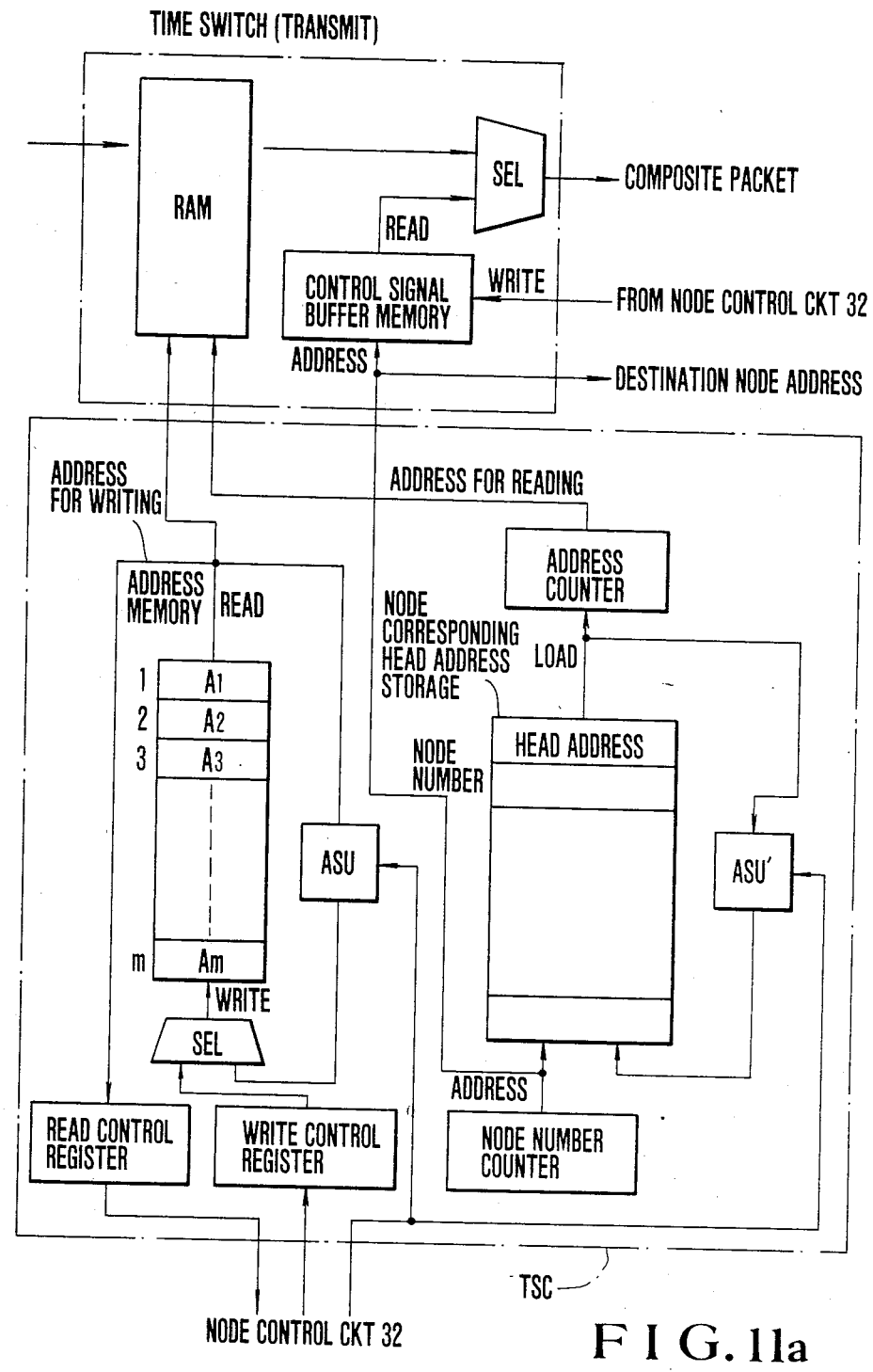
Figure 11B:
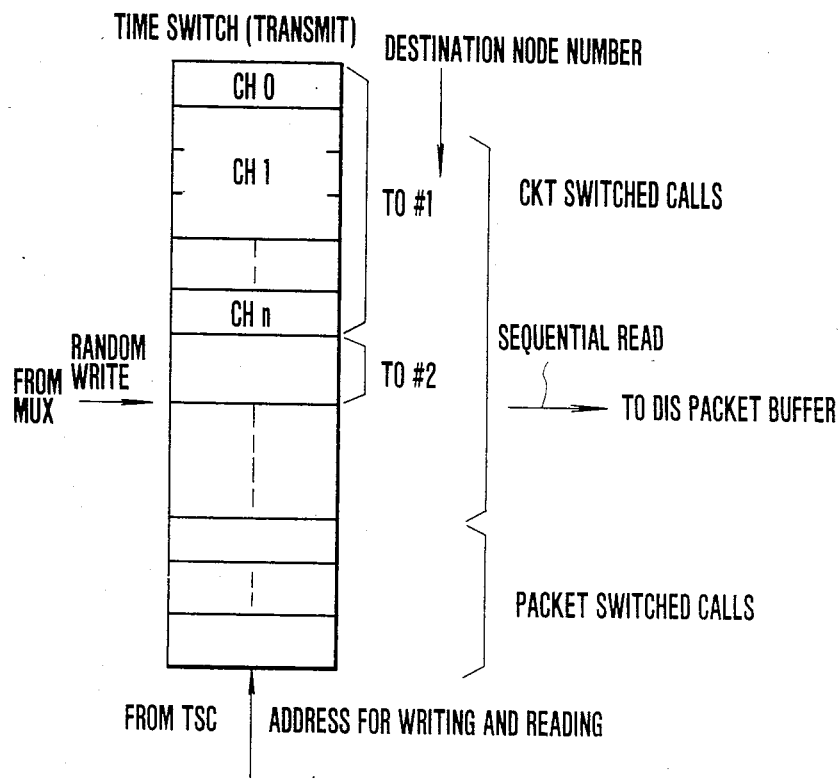

The time switch and TSC will now be described in detail with reference to FIGS. 11a and 11b. The time switch consists of a random access memory RAM. On the transmitting side, digitally multiplexed channel information is written into the memory and read out therefrom to be transferred to DIS and the packet buffer. On the receiving side time switch, converse operation takes place. Information is written randomly in memory addresses designated by the time switch controller TSC for each input highway time slot. More specifically, the TSC designates write addresses for individual time slot such that input channel information is written from the first address in the order of node numbers, e.g. information for the node #1, then information for the node #2 and so forth, and also in the order of channel numbers for the same node, e.g., channel #1 (CH 1), then channel #2 (CH 2) and so forth, as shown in FIG. 11b which details the RAM. In an input communication channel having k times the standard communication speed, k time slots in a frame are used for communication. The TSC designates write addresses such that these k input information time slots are written continuously in the time switch memory. If one frame has m time slots, the TSC consists of an m-word RAM. In order for different channels for the same destination node to be always written in the time switch memory in the regular order, e.g., CH 1, CH 2, ..., the memory content of the TSC must be updated every time a channel is released or a new channel is set up. Consider now a case when a channel #j call having a destination node #1 is released. It is assumed that the channel is a k times standard communication speed channel using k words and has been stored in time switch memory addresses $a_{ij}, a_{ij+1}, \ldots, a_{ij+(k-1)}$. As a result of the clear-down of this channel, the memory content stored in the elder memory address areas must be carried up by k addresses. To accomplish this, while the successive contents $A_1, A_2, \ldots, A_m$ of the TSC are applied to the time switch, as addresses for writing their addresses $A_r$ (r = 1, 2, ..., m) is compared with $a_{ij}$ for each time slot, and if $A_r > a_{ij+(k-1)}$, k is subtracted from the TSC address r, that is, the TSC address is corrected from $A_r$ to $A_r - k$. When a new k times standard speed channel #j call having a destination node #i occurs, requiring addresses $a_{ij}, a_{ij+1}, \ldots, a_{ij+(k-1)}$ for k words, memory contents stored in elder memory addresses have to be carried down by k addresses. This is accomplished by adding k to all TSC memory addresses $A_r$ (r = 1, 2, ..., m) which are $A_r \geq a_{ij}$, that is, correcting the addresses $A_r$ to $A_{n+k}$. It will be readily understood that if the addresss $a_{ij}$ is a sufficiently large value (e.g., the last address of the time switch memory), the TSC memory content remains the same unless there occurs neither channel set-up nor clear-down. An address shift unit ASU undertakes the TSC memory content correction as noted in response to a command from the node control circuit 32. More specifically, it compares the TSC memory content $A_r$ (r = 1, 2, ..., m) read out for each input time slot to a first value $a_{ij}$ set in accordance with a node control circuit command. If $A_r > a_{ij}$, it adds a second value k, which is also set by the node control circuit, to $A_r$ or subtracts the value therefrom, and writes the result in the original address r in the TSC.

In the time switch controller TSC, a node number counter provides successive node numbers. More specifically, it provides a node number whenever the reading of information for the immediately preceding node number from the time switch is completed. The node number output is fed as destination node address to the composite packet transmit/receive circuits 30.

A node corresponding head address storage memorizes the first address of the time switch memory content for each destination node. Every time the node number counter output is changed, it writes the new first address for the corresponding node into an address counter. An address shift unit ASU' undertakes the node corresponding head address storage content correction in a manner similar to the address shift unit ASU. The address counter up-counts and provides a time switch read address every time a time switch memory content is read out.

When the address counter output coincides with the first address for the next node, the node counter content is updated. The output of the node counter is also fed to a control signal buffer memory in the time switch, and control message is sent prior to the call information for the corresponding node.

Sequence of Control Between the Node Control Circuit 32 and TSC

(Setting-Up of Circuit-Switched Channel)

For the set-up of a circuit-switched channel, the node control circuit 32 derives the destination node number from the destination terminal number, and sends a channel set-up request, the destination terminal number and the source terminal number to the destination node in the control signal part C of a composite packet. The circuit 32 produces the content of the control signal part C and writes it into a control signal buffer memory (see FIG. 11a) in the transmitting side time switch. An acknowledgement from the destination node is sent also on the control signal part C of a composite packet. The message is written into the receiving side time switch control signal buffer memory and then read into the node control circuit 32. When the acknowledgement of the channel set-up request is received, the node control circuit 32 derives the address $A_L$ that is occupied by the trailing end of the composite packet designated to the destination node from a table which is stored in the MM. Then it delivers an address add command to the ASU in the TSC. The content of the address add command is to add a number w necessary for the storage of the new call information to addresses elder than $A_L$. At the same time, the node control circuit 32 delivers an address write command to the address memory in the TSC. This command is to allot the addresses $A_{L+1}$, $A_{L+2}$, ..., $A_{L+w}$ of the time switch for the new call. The content $A_{L+1}$, $A_{L+2}$, ... $A_{L+w}$ is written into addresses of TSC corresponding to the time slot positions on the input highway for the pertinent channel. The command is registered in a write control register (see FIG. 11a) for execution.

In the above sequence, the content of the TSC address memory is updated such that the information of the new call is inserted in the trailing end of a composite packet designated to the pertinent destination node in the time switch, thus completing the channel set-up. The same operations of the node control circuit 32, TSC, etc. also take place in the destination node.

(Clearing-Down of Circuit-Switched Channel)

For the clear-down of a circuit-switched channel, the node control circuit 32 derives the destination node number, destination terminal number, source terminal number and number w' of addresses occupied in the time switch for the call, for which the clear-down is requested, from the table, and notifies the destination node of these data using the control signal part C of the composite packet. When the acknowledgement of the channel clear-down request, like the acknowledgement of the channel set-up request, the node control circuit 32, reads out the addresses $A_L'$ in the time switch for the pertinent call through a read control register (see FIG. 11a) in the TSC. Then it delivers an address subtract command to the ASU in the TSC. This command is to subtract w' from addresses elder than $A_{L'+w'}$. At the same time, it delivers a clear demand to the TSC address memory to clear memory areas of addresses corresponding to the time slot positions on the input highway for the pertinent channel. The clearing means writing addresses which do not actually present in the time switch. The writing is done by the write control register noted above.

In the above sequence, the clear-down of a call is effected. The same operations of the node control circuit 32, TSC, etc. also take place in the destination node.

Functions of Packet Buffer and Packet Controller and Relation Thereof to Node Control Cirucit 32

Figure 11C:
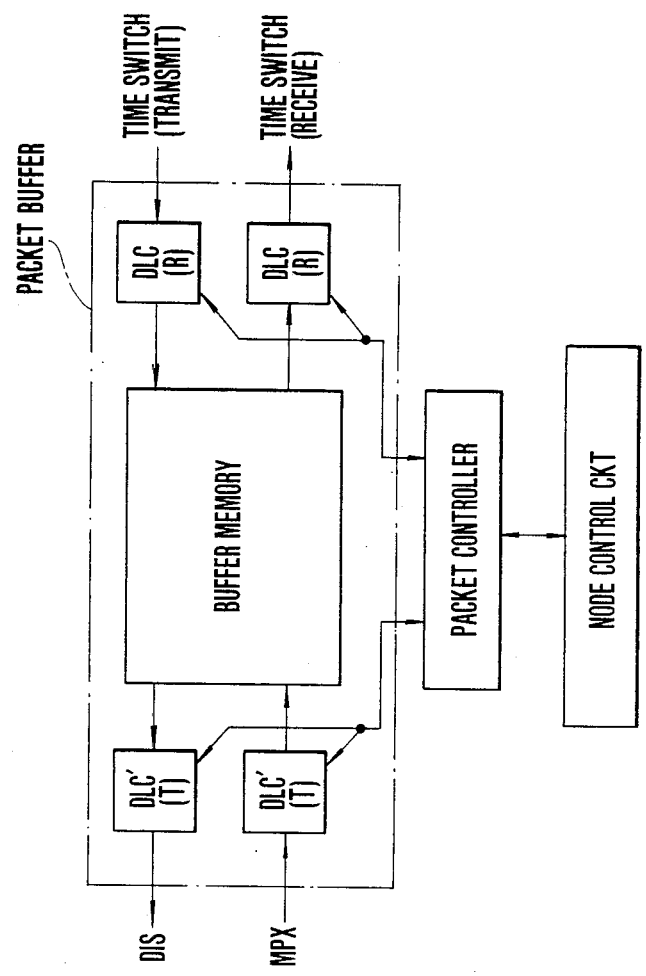

FIG. 11c shows the packet buffer. A data link controller for transmission DLC (T) and a data link controller for reception DLC (R) deal with the procedure of control on transmission to and from inter-office trunks and user access lines. These controllers handle substantially the same form of data as data transferred from packet buffer to DIS and data transferred from MPX to packet buffer. Data link controllers DLC' (T) and DLC' (R) deal with the procedure of control on transmission to and from other nodes. These controllers execute the insertion and deletion of flag (F), insertion and deletion of control signal (C), parity check, etc. (See FIG. 11d). The buffer memory stores only the packet header and packet information, and flags and other control messages are all inserted and deleted by the DLC and DLC'. The DLC' (T) adds a destination node number to the packet part transferred to the DIS. The DLC' (R) adds a destination node number to the packet part transferred from the MPX. The packet controller executes re-transmission control when an error is detected, analysis of reception control signal and editing of transmission control signal by exchanging control data with the DLC and DLC'. It also executes the allotting of buffer memory areas for packets and control of reading and writing of packets in the buffer memory. The node control circuit performs call processing concerning packets including the deriving of the destination terminal number, destination node number, etc. upon request from the packet controller. As shown in FIG. 11d, the packet is divided into some segments or together with part of other packet, and sent out to a loop in the packet-switched information part PS of a composite packet. This is executed when the packet is read out from the packet buffer for transmission.

Figure 13:
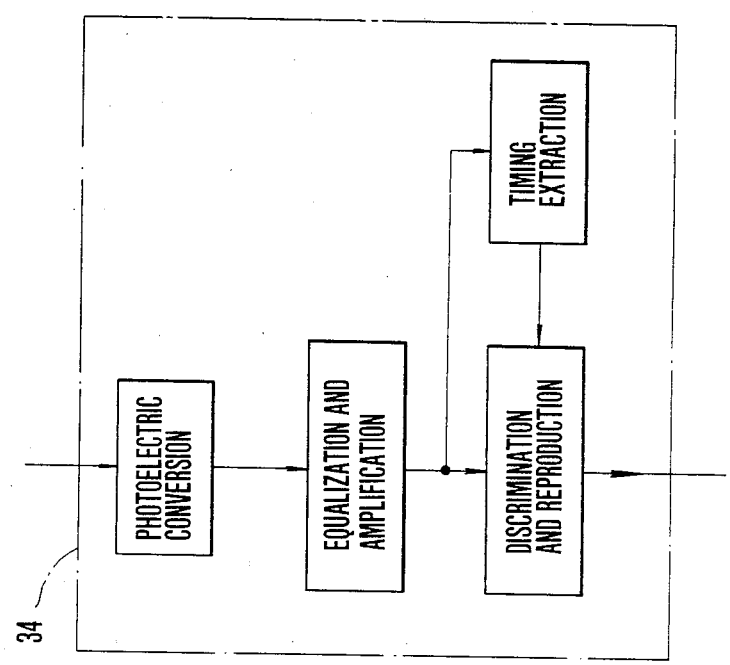

FIG. 13 shows the structure of the receiving circuit 34 applied to a network which uses optical fibers for loops. The incoming signal is photoelectrically converted, equalized and amplified. Then, timing extraction is done using a tank or oscillator for discrimination and reproduction of the original digital signal.

Figure 14:
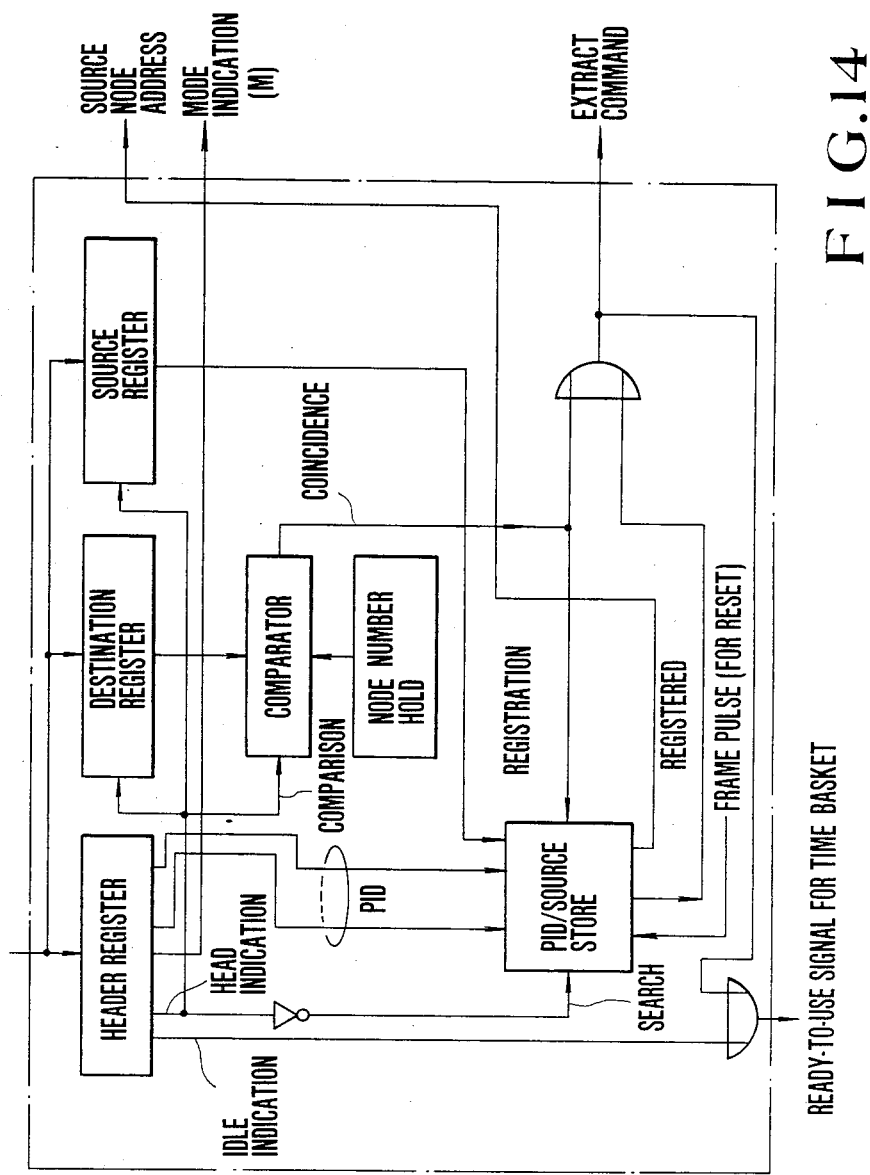

FIG. 14 shows the received time basket control circuit 36. It extracts the header of each time basket among the reproduced digital signals. With a busy time basket having the head indication, it extracts the destination node address and source node address following the packet indicator PID and checks whether the time basket is self-addressed by comparison to the own node number. If the time basket is self-addressed, it registers the source node address corresponding to PID. It also supplies an extract command and source node address to the receivng buffer 37. With a time basket without head indication, it checks whether the packet indicator PID has been registered in a PID source store as the self-addressed one. If this is so, it supplies the source node address corresponding to the extract command to the receiving buffer. The PID store is reset for each frame. With a time basket with "idle" indication and self-addressed time basket, it supplies a ready-to-use signal to the transmission time basket control circuit 39.

Figure 15A:
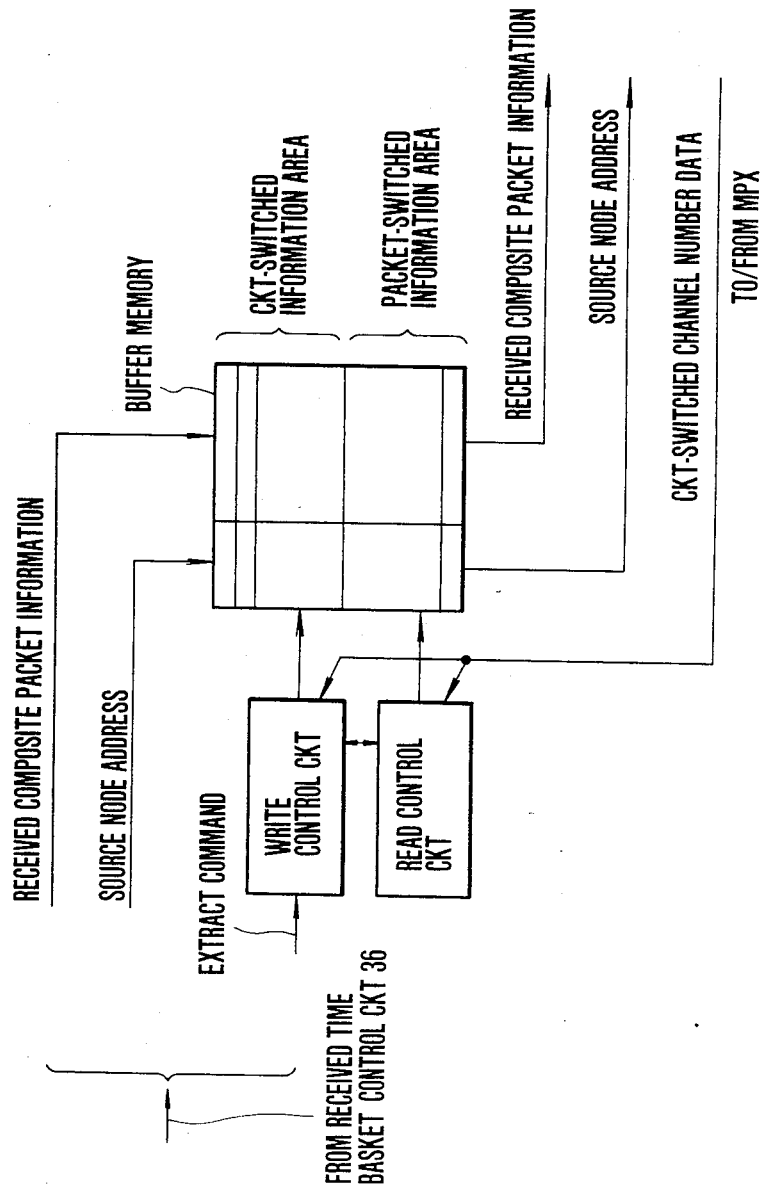

FIG. 15a shows the receiving buffer 37. It is provided for preventing overlap transmission from the plural composite packet transmit/receive circuits to the composite packet assembling/disassembling circuit 31.

The receiving buffer 37 writes received composite packet information and source node address thereof into a buffer memory according to an extract command. The circuit- and packet-switched information are discriminated and are successively written in their respective areas. A write control circuit determines the boundary between the circuit- and packet-switched information parts of each composite packet from circuit-switched channel number data supplied from the node control circuit 32 through the MPX in the composite packet assemble/disassemble circuit 31. The written information and source node address are read out and supplied to the composite packet assemble/disassemble circuit 31 under the control of a read control circuit.

Figure 16A:
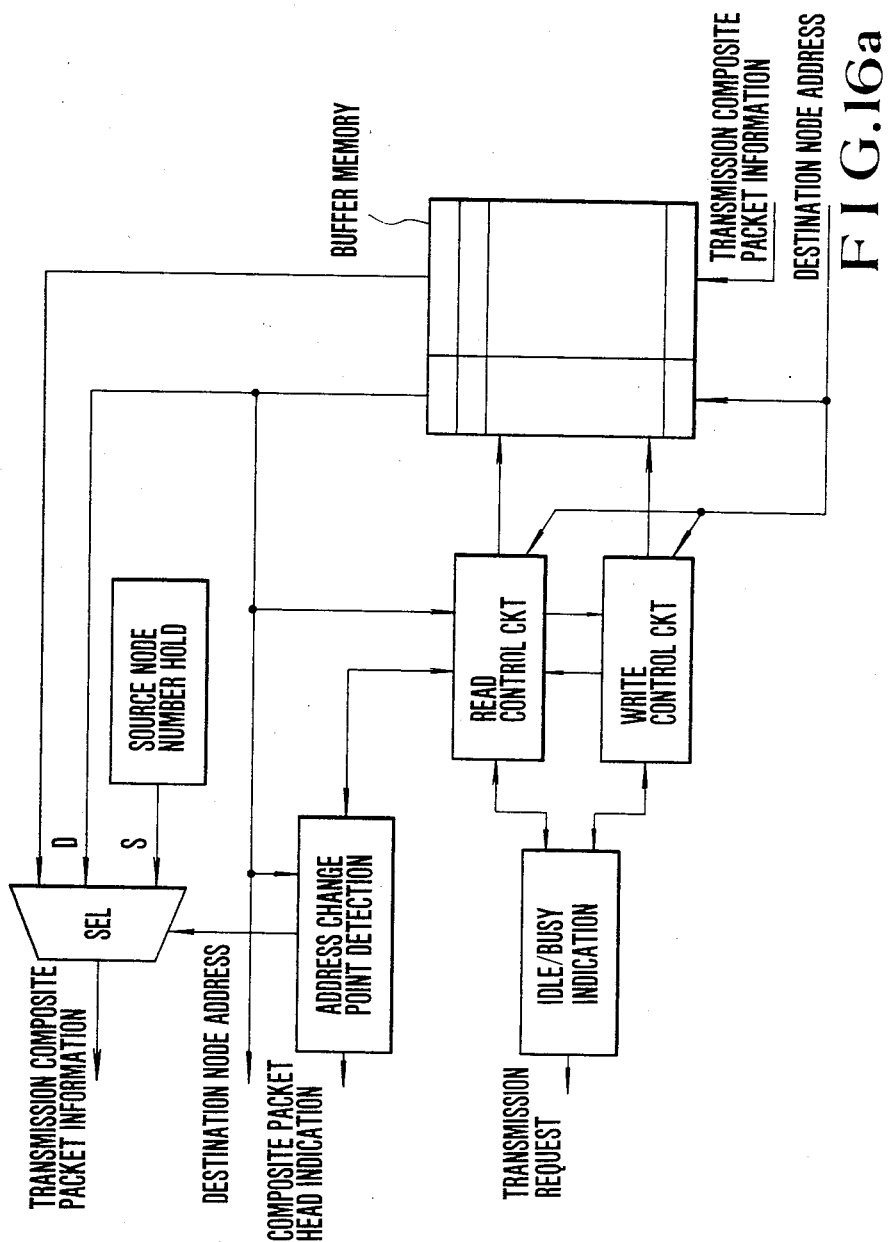

FIG. 16a shows the transmitting buffer 38. It stores transmission composite packet information and destination node address from the composite packet assemble/disassemble circuit 31 into a buffer memory. The buffer memory has circuit- and packet-switched information areas, and circuit- and packet-switched information are written in the respective areas. In reading, circuit-switched information is first read out from the buffer memory. Packet-switched information is sent if it is possible to do so after circuit-switched information has been sent. Every time a new frame sets in, the circuit-switched signal is sent first. A point of change of read-out destination node addresses is observed. When it is detected, the reading from the buffer memory is interrupted to transmit the destination node address and source node address. When this is completed, the reading is resumed. The destination node address change point detection operation is inhibited when sending packet-switched information. Whether there is information stored in the buffer memory is determined from the operations of read and write control circuits. If there is information, a transmit command is supplied to the transmission time basket control circuit 39.

Figure 17:
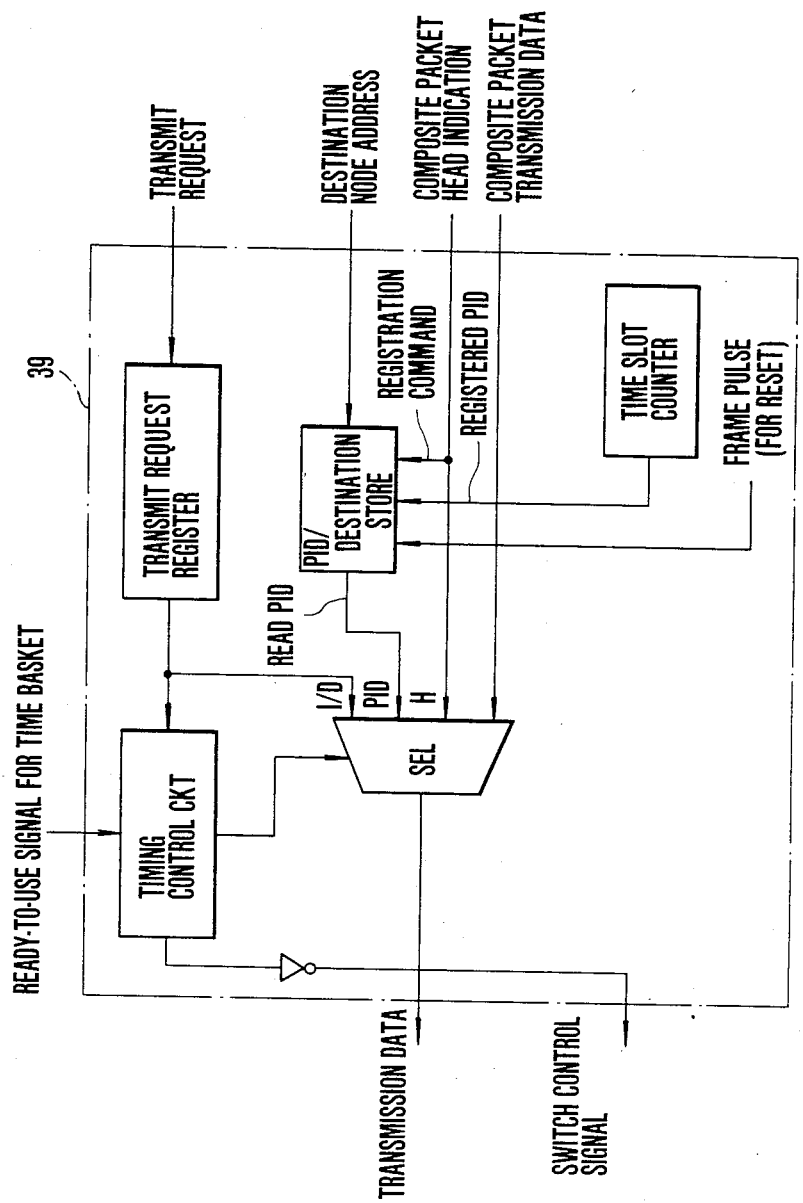

FIG. 17 shows the transmission time basket control circuit 39. When there is a time basket capable of use, upon request for transmission it sends the PID corresponding to the destination node address after setting the idle/busy bit to "1". When sending the head of a composite packet, it sets "1" in the head indicator H and registers the PID corresponding to the destination node address to the PID/Destination store. In this example, the time basket number used for the head of the composite packet is registered as the PID. Subsequently, composite packet information is sent. A timing control circit controls a selector SEL for selecting the control data and call information. A switch control signal is transmitted depending on whether a time basket is capable or incapable of use.

Figure 18:
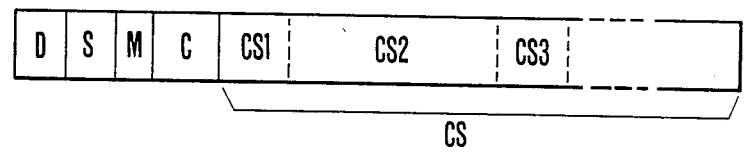
FIG. 18 is a view showing a configuration of a circuit-switched composite packet according to the invention.
Figure 19:
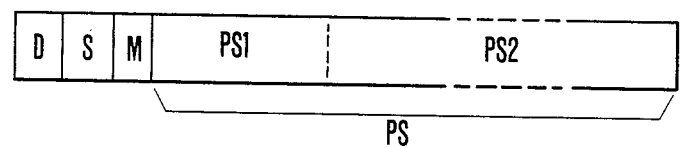
FIG. 19 is a view showing a configuration of a packet-switched composite packet according to the invention.

FIGS. 18 and 19 show a composite packet configuration adopted in a second embodiment of the invention. In this embodiment, two separate composite packets are used for the respective circit- and packet-switched information parts CS and PS in the packet configuration shown in FIG. 4. Like symbols as in FIG. 4 represent like contents. In this case, a switching mode indicator M is used to indicate that the composite packet is for circuit-switched mode information or packet-switched mode information to be described later. Logic "1" is set in this indicator for the circuit-switched mode, and "0" is set for the packet-switched mode. This mode indication is necessary because generally both circuit- and packet-switched composite packets are transmitted and received between a pair of nodes. Like the case of the packet-swtiched information part PS shown in FIG. 4, packet-switched mode composite packet transmission may not be completed within on cycle time. Therefore, every time a new cycle sets in, the destination node address D and so forth are added to the head of the remaining packet-switched information part PS. Information is thus sent on loop in the form of a composite packet shown in FIG. 19 for each cycle time. At this time, the length of the packet-switched information part PS of a composite packet varies for every cycle time depending on the amount of channel information in the packet-switched mode calls arriving at the node and also on the congestion of the loop. Therefore, there may occur a cycle time, during which no packet-switched mode composite packet is sent. In the case of the packet-switched call, unlike the circuit-switched call, the information arriving at the node may be stored in the buffer memory for queuing. For this reason, the procedure of transmission as described is possible.

Figure 15B:
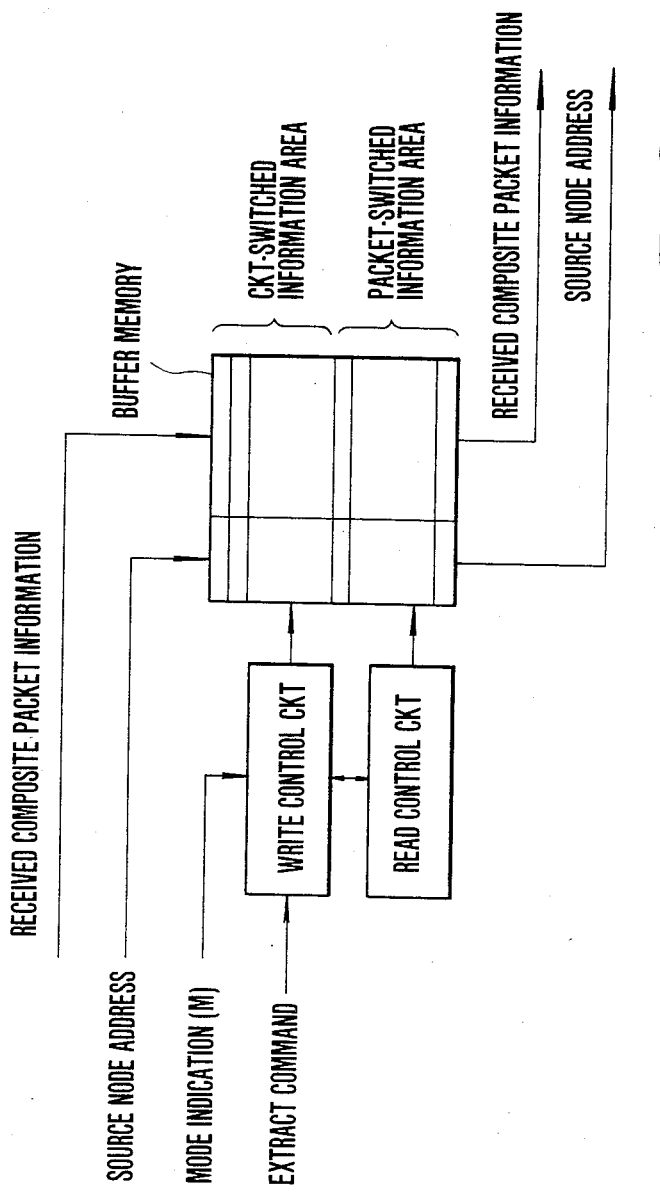

Control data concerning the set-up and clear-down of packet-switched channel is always contained in communication message itself. Therefore, the control signal part C in the format of FIG. 18 is not needed for the packet-switched channel, so that it is omitted in the format of FIG. 19. Such composite packets can also be transmitted and received between nodes shown in FIGS. 8 through 14, 15b, 16b and 17. In this case, the received time basket control circuit 36 (FIG. 14) also detects the switching mode indicator M of each composite packet and sends it to the receiving buffer 37. The receiving buffer 37 (FIG. 15b) writes received composite packet information and source node address thereof into a buffer memory according to an extract command or mode indication M from the received time basket control circuit 36. The other part and functions of the receiving buffer 37 in FIG. 15b is the same as that of the receiving buffer 37 in FIG. 15a. The transmitting buffer 38 (FIG. 16b) sends the destination and source node addresses and the mode indication data M when a point of change of read-out destination node addresses is detected. The destination node address change point detection is not inhibited even when sending packet-switched information. The rest of the transmitting buffer 38 is common in FIG. 16a and FIG. 16b.

Figure 20:
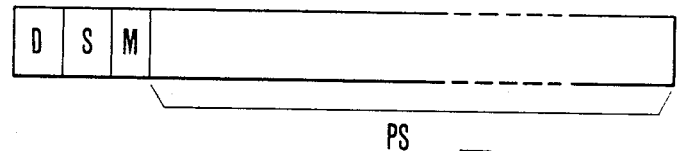
FIG. 20 is a view showing a configuration of packet-switched non-composite packet.

FIG. 20 shows a packet configuration adopted in a third embodiment of the invention. In this embodiment, a packet-switched packet is constructed as a non-composite packet or a single packet. Packet-switched channel information is accommodated in its packet-switched information part PS. This configuration of packet-switched non-compoiste packet is also sent on the loop noted above. A packet-switched non-composite packet, however, may not be completely transmitted in one cycle time. Therefore, every time a new cycle time sets in, the destination node address D and so forth are added to the head of the remaining packet switched information part PS, whereby information is transmitted to the loop in the format of FIG. 21 for each cycle. The length of the packet-switched information part PS of a non-composite packet varies for each cycle depending on the amount of packet-switched channel information arriving at the node and the congestion of the loop. The packet of this configuration may also be transmitted and received with the structure shown in FIGS. 8 through 14, 15b, 16b and 17.

As has been described in the foregoing, both circuit- and packet-switched calls can be controlled in a unified procedure in the form of composite packets, so that real integration can be realized. Thus, there is no need of preliminarily sharing the loop transmission capacity between the two switching modes, but the capacity proportions can be dynamically and instantaneously varied, thus simplifying the control, eliminating overhead as in the prior art and extremely improving the system efficiency. Besides, once a necessary amount of time baskets is secured between specific nodes, subsequently a compoiste packet can be transmitted for every frame. Thus, delay time variation inherent to the prior art packet switching system is never caused for circuit-switched calls, and time transparency can be guaranteed. Further, since a plurality of simultaneously communicating channels are integratedly handled in the form of composite packet, the overhead per call can be reduced, and also the amount of information per call occupying the composite packet can be reduced. Thus, the packet assembling/disassembling time can be reduced to reduce the composite packet transmission interval, i.e., frame cycle, to minimize the delay time in the entire system. Furthermore, as a result of provision of the composite packet indicator PID in each time basket, only a necessay number of time baskets can be assembled to send a composite packet having a variable length for each frame. Thus, it is possible to provide a highly versatile switching function to a heterogeneous traffic network which covers different bandwidth or speed communication services or communication services of different traffic characteristics. The invention is vary beneficial as a system which can integrate the circuit and packet switching functions and accommodate a very wide variety of communication services by a single switching procedure. Also, when the architecture of FIG. 2 is regarded as a local area network, the invention is further applicable to local area networks.

What is claimed is:

1. An integrated circuit/packet switching system comprising:
a plurality of nodes and one or more common access loops forming an inter-node network, said loop or loops having a fixed time cycle frame format;
means including each of said nodes for sorting circuit- and packet- switched call messages which are incoming from user access lines and/or inter-office trunks, said sorting being according to destination node addresses of said messages, for assembling a plurality of said sorted circuit- and packet-switched call messages, which are destined to the same node, into one or more composite packets for each destination node every frame cycle time, and for sending said assembled composite packet or packets on said loop or loops for each frame cycle time; and
means including each of said nodes for extracting self-designated composite packets from said loop or loops, for disassembling the extracted composite packets into the respective circuit- and packet-switched call messages, and for forwarding said messages to the intended user access lines and/or inter-office trunks.

2. An integrated circuit/packet switching system in accordance with claim 1 wherein each of said frames contains a plurality of time slots, and each of said composite packets is transmitted on said loop or loops by using a necessary number of said time slots in the frame during which transmission occurs.

3. An integrated circuit/packet switching system comprising:
a plurality of nodes and one or more common access loops forming an inter-node network, said loop or loops having a fixed time cycle frame format;
means including each of said nodes for sorting circuit-switched call messages which are incoming from user access lines and/or inter-office trunks, said sorting being according to destination node addresses, for assembling a plurality of said sorted circuit-switched call messages, which are destined to the same node, into one or more circuit-switched composite packets for each destination node every frame cycle time, and for sending said assembled circuit-switched composite packet or packets on said loop or loops for each frame cycle time;
means including each of said nodes for sorting packet-switched call messages which are incoming from user access lines and/or inter-office trunks, said sorting being according to the destination node addresses, for assembling a plurality of sorted packet-switched call messages, which are destined to the same node, into one or more packet-switched composite packets for each destination node, and for sending said assembled packet-switched composite packet or packets on said loop or loops; and
means including each of said nodes for extracting self-designated circuit- and packet-switched composie packets from said loop or loops, for disassembling the extracted circuit- and packet-switched composite packets into respective circuit- and packet-switched call messages, and for forwarding said messages to the intended user access lines and/or inter-office trunks.

4. An integrated circuit/packet switching system in accordance with claim 3 wherein each of said frames contains a plurality of time slots, and each of said circuit- or packet-switched composite packets is transmitted on said loop or loops by using a necessary number of said time slots in the frame during which transmission occurs.

5. An integrated circuit/packet switching system comprising:
a plurality of nodes and one or more common access loops for inter-node network, and said loop or loops having a fixed time cycle frame format;
means including each of said nodes for sorting circuit-switched call messages incoming from user access lines and/or inter-office trunks according to the destination node addresses, for assembling a plurality of said sorted circuit-switched call messages, which are destined for the same node, into one or more circuit-switched composite packets for each destination node every frame cycle time, and for sending said assembled circuit-switched composite packet or packets on said loop or loops for each frame cycle time;
means including each of said nodes for sorting packet-switched call messages incoming from user access lines and/or inter-office trunks according to their destination node addresses, for assembling each of said sorted packet-switched call messages into a packet-switched non-composite packet, and for sending said assembled packet-switched non-composite packet or packets on said loop or loops; and means including each of said nodes for extracting self-designated circuit-switched composite packets and packet-switched non-composite packets from said loop or loops for disassembling the extracted circuit-switched composite packets, for packet-switched non-composite packets into respective circuit- and packet-switched call messages, and for forwarding said messages to the intended user access lines and/or inter-office trunks.

6. An integrated circuit/packet switching sytem in accordance with claim 5 wherein each of said frames contains a plurality of time slots, and each of said circuit-switched composite packets or packet-switched non-composite packets is transmitted on said loop or loops by using a necessary number of said time slots in the frame during which transmission occurs.

* * * * *